United States Patent [19]

Merges

[11] 4,273,101
[45] Jun. 16, 1981

[54] SOLAR ENERGY SYSTEM

[75] Inventor: Veit Merges, Putzbrunn, Fed. Rep. of Germany

[73] Assignee: Messerschmitt-Bölkow-Blohm GmbH, Munich, Fed. Rep. of Germany

[21] Appl. No.: 41,775

[22] Filed: May 23, 1979

[30] Foreign Application Priority Data

Jun. 13, 1978 [DE] Fed. Rep. of Germany ....... 2825775

[51] Int. Cl.³ ................................................. F24J 3/02
[52] U.S. Cl. .................................... 126/435; 126/438; 126/436; 126/900; 165/104.13; 165/104.18; 165/104.34
[58] Field of Search ............... 126/438, 439, 436, 450, 126/900, 400, 435; 165/104 S, 107

[56] References Cited

U.S. PATENT DOCUMENTS 3,908,632  9/1975  Poulsen ................................ 126/900
4,077,849  3/1978  Ziehm, Jr. ............................ 126/900
4,136,668  1/1979  Davis ................................... 126/430

Primary Examiner—James C. Yeung
Attorney, Agent, or Firm—Toren, McGeady and Stanger

[57] ABSTRACT

A system for generating solar energy utilizes a plurality of solar radiation absorption bodies formed as spherical balls which interact with solar radiation focalization devices which constitute paraboloid mirrors in order to effect heating of the spherical balls by the solar radiation which is concentrated at an irradiation position defined by the paraboloid mirrors. The heated balls are transported to a heat accumulator and after the heat has been absorbed therefrom they are returned to the focalization mirrors. At the mirrors, balls are held in holding devices until a heated ball leaves the irradiation position and switch devices operate to provide new balls to a vacant holding position. A feed and return system for transporting the balls between the accumulator and the focalization mirrors may comprise thermally insulated pipes and the balls may be moved by gravity feed or by a compressed air system.

26 Claims, 2 Drawing Figures

SOLAR ENERGY SYSTEM

BACKGROUND OF THE INVENTION

The present invention relates generally to energy generating systems and particularly to a system for absorbing and converting solar energy. The invention is particularly related to a solar farm having radiation concentrators, particularly readjustable concentrators distributed over an area having focal points where radiation absorption may take place, the system also including a heat accumulator.

Solar farms of the type indicated above are known and they usually operate to supply energy to solar power plants. In this concept of radiation collection, not only are gaseous mediums used but liquid heat transfer mediums may also be used for thermal transport of energy from the focal points of the radiation concentrators to a central utilization point. However, it will be found that liquid is the medium most predominantly used.

In any case, pipes for conveying the heat transfer media are generally required, with these pipes being several hundred meters in length and having excellent thermal insulation. Since the operating temperatures of the heated medium may reach levels of between 300° and 500° C., the requirements established for pipe design, sealing systems and fittings are extremely demanding. The heat carrier must be circulated by means of pumps which will utilize additional energy. Pipes carrying the heat transfer medium, including the medium itself, will have a significant heat capacity which will negatively affect the actual output of the system.

Furthermore, it will be found that the heat carrier media tend to exhibit poor storage characteristics so that accumulators with large volumes and with accompanying insulation problems must be utilized.

The present invention is directed toward provision of a solar farm of the aforementioned type wherein a new form of absorber which does not exhibit the disadvantages discussed above may be utilized and evenly transported through the system.

SUMMARY OF THE INVENTION

Briefly, the present invention may be described as a solar energy system comprising solar radiation focalization means; a plurality of solar radiation absorption bodies interacting with said focalization means to effect heating of said absorption bodies by solar radiation through operation of said focalization means; said focalization means comprising a plurality of solar radiation concentrators defining focal points which constitute irradiation positions at which said absorption bodies may be located to absorb solar radiation; heat accumulator means receiving heated absorption bodies from said focalization means and withdrawing heat therefrom; feed and return means for transporting said absorption bodies between said accumulator means and said focalization means; and means for delivering said absorption bodies individually to said irradiation positions at said focal points of said radiation concentrators and for maintaining said bodies in a position to receive concentrated solar energy from said concentrators until said bodies have reached a desired temperature.

The radiation absorption bodies may be spherical balls which have high heat absorption capacities and which may be easily transported between the accumulator means and the radiation concentrators. The radiation concentrators are advantageously formed as paraboloid mirrors and the balls are retained in the irradiation position during heat absorption by holding devices which will release the balls for transport to the accumulator means after the balls reach a desired temperature. The feed and return means may be formed as a roller system for transporting the balls with roller tracks leading to and from the heat accumulator whereby after the heat has been withdrawn from the heated balls they may be returned to the concentrators and thus recycled continuously through the system.

The various features of novelty which characterize the invention are pointed out with particularity in the claims annexed to and forming a part of this disclosure. For a better understanding of the invention, its operating advantages and specific objects attained by its use, reference should be had to the accompanying drawings and descriptive matter in which there are illustrated and described preferred embodiments of the invention.

Figure 1:
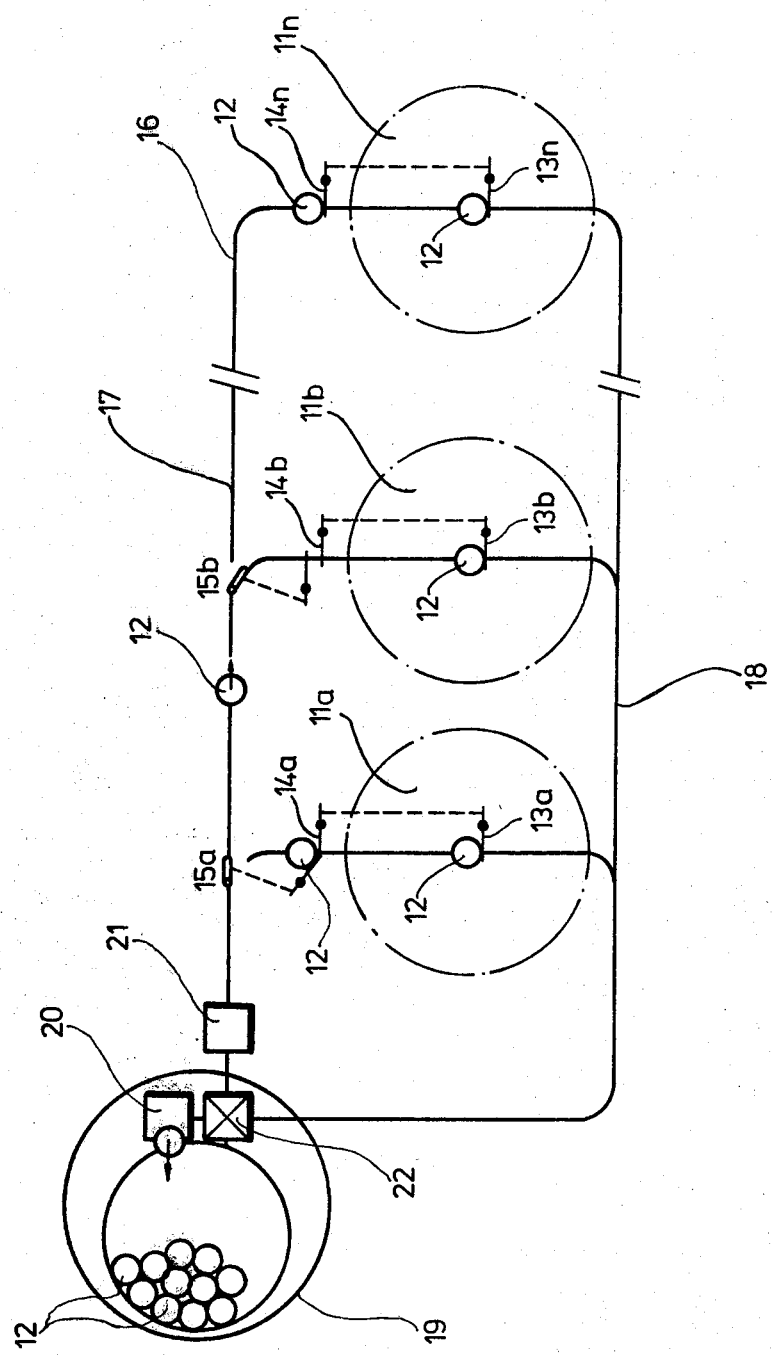
FIG. 1 is a schematic illustration showing the basic arrangement of a solar farm or solar system in accordance with the present invention.

Referring now particularly to FIG. 1 wherein the overall inventive system or solar farm is shown schematically, there are provided a number of solar radiation focalization devices particularly embodied by a plurality of irradiation concentrators 11a, 11b, 11n which may, for example, be composed of paraboloid mirrors. The mirrors may be adjusted to a position relative to the sun in a known manner, not shown in detail, whereby they will operate to focalize solar radiation and to define irradiation positions at which appropriate radiation absorption bodies may be located to interact with the solar mirrors to absorb radiation and thereby become heated.

In particular, the invention provides as solar radiation absorption bodies a plurality of spherical balls 12 which are circulated through the system shown in FIG. 1 between each of the focalization mirrors 11 and a heat accumulator device 19.

In order to appropriately absorb solar radiation from the paraboloid mirrors 11, the balls 12 are placed in the irradiation position defined by the mirrors when they are at a focal point of the mirrors. In order to retain the balls 12 at the focal point or irradiation position defined by the mirrors 11, a simple holding device 13a, 13b, 13n is provided which may, for example, be in the form of a sheet metal member having therein an indentation wherein the balls may be held. The holding device 13 may be actuated through an electrical or through a thermomechanical sensor. Accordingly, the balls 12 will be automatically displaced from their position at the focal point of the mirrors 11 when a certain temperature of the balls is reached. The holding devices operate to sense the temperature of the balls and to release a heated ball at the appropriate time.

During the time that a ball 12 is held at the irradiation position relative to the mirror 11, another ball 12 is held at a waiting position 14, there being shown in the diagram of FIG. 1 waiting positions 14a, 14b and 14n for each of the radiation concentrators 11a, 11b and 11n respectively. A cold ball held at a waiting position 14 is moved into the irradiation position from the waiting position at the same time that a heated ball is released from the irradiation position. The balls 12 are supplied to the concentrators 11 through a feed and return roller system generally identified by the numeral 16. The roller system 16 includes a feed roller track 17 wherein there are arranged switch members 15a, 15b which, in turn, are controlled in accordance with whether or not a cold ball 12 occupies the waiting position 14a, 14b. When a waiting position, for example the position 14b, is vacant, a switch 15b will be shifted to a position where a ball 12 moving along the feed roller track 17 will be directed toward the vacant waiting position 14b. Thus, by switching of the switch member 15a, 15b, a ball 12 may be brought to a vacant waiting position at each of the concentrators 11a, 11b from the heat accumulator 19 along the feed roller track 17.

The feed and return roller system 16 also includes a return roller track 18 which operates to deliver heated balls 12 from the focalization mirrors 11 to the heated accumulator 19. Thus, the feed and return roller tracks 17, 18 extend continuously from the heat accumulator 19 through locations at the spaced focalization mirrors 11 and then returning to the heat accumulator 19. The system 16 is designed in such a way that gravity forces may be utilized as the means for effecting movement of the balls to the system 16. The system 16 may be designed with a natural slope from the accumulator 19 to the focalization mirrors 11 by appropriate canting of the track 17, with a similar but reverse slope provided in the roller track 18.

Figure 2:
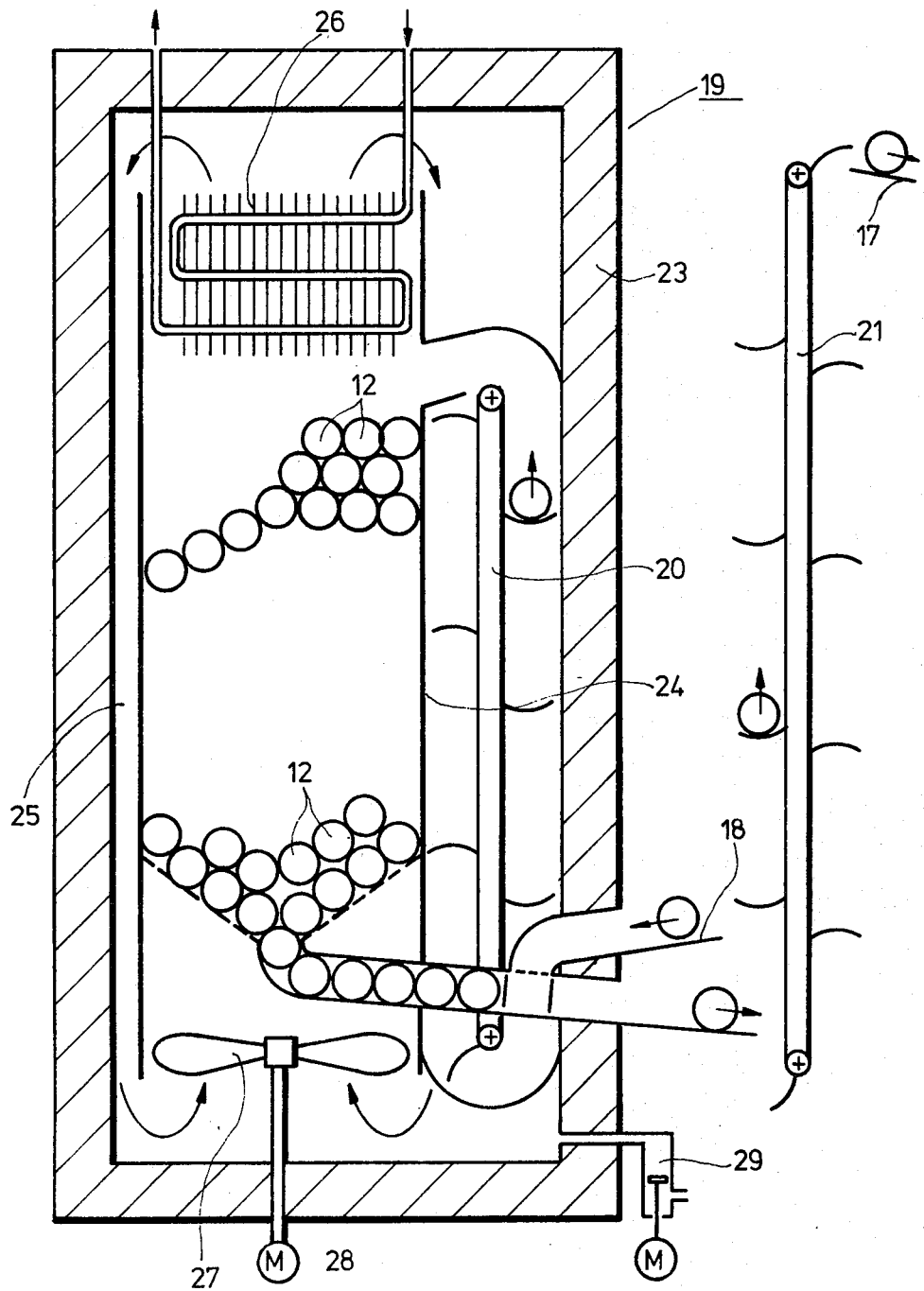
FIG. 2 is a schematic elevation partially in section showing a heat accumulator utilized in the system of the invention.

The accumulator 19 is shown in greater detail in FIG. 2. Heated balls 12 after leaving the irradiation position at a focalization mirror 11 will be transported by the return track 18 to the accumulator 19. The hot balls are supplied at an input point in the accumulator 19 and through an elevator 20 they are raised to the upper side of the accumulator on the interior thereof where they may be deposited upon a stack of such balls located within the accumulator 19. Cold balls may be lifted from a bottom outlet of the accumulator 19 by means of an elevator 21 which will deposit the balls onto the feed track 17. The accumulator 19 includes a lock 22 which prevents pressure losses in the heat accumulator 19 during input and discharge of the balls 12.

As shown in FIG. 2, the accumulator 19 comprises a heat insulating outer jacket 23. An interior space 24 is filled with balls 12 with a funnel being formed in the lower region thereof. A gaseous medium seving for removal of heat from the accumulated balls 12 within the accumulator 19 is passed through an intermediate space 25 which is arranged between the interior space 24 at the outer jacket 23.

In the upper region of the interior space 24 there is provided a heat exchanger 26 having flow lines extending to the exterior of the heat accumulator 19 for appropriate flow of a heat exchange medium. In the lower region of the accumulator 19 there is provided a blower 27 with a motor 28 whereby air may be forced through the accumulator 19 as indicated by the arrows for removal of heat from the accumulated balls 12 and for transfer of the heat to the heat exchanger 26.

The elevator 20 for the heated balls is arranged on the interior of the accumulator 19 with the elevator 21 for the cold balls being arranged on the exterior of the accumulator 19. A motor driven valve 29 is provided for ventilation of the accumulator 19.

Hot balls reaching the accumulator 19 through the return roller track 18 are engaged within the elevator 20, as indicated in FIG. 2, and they are conveyed upwardly and deposited upon the stack of balls shown within the space 24. Removal of the balls from the bottom side occurs as indicated in FIG. 2, with the cold balls being conveyed to the elevator 21 where they are raised upwardly and then deposited upon the feed roller track 17 to be transported back to the paraboloid mirrors 11 in the manner previously described.

During the dwell time while the balls are in the accumulator, a gaseous medium, for example air, is passed through the stack of accumulated balls by means of the blower 27 and the motor 28 whereby heat will be removed from the balls with the heat then being transferred to the heat exchanger 26 which, in turn, removes the heat from the air for further use, for example in a power plant.

The spherical balls 12 may comprise hermetically welded spherical jackets of steel filled with a latent storage medium, for example, LiF/LiCl. The diameter of the spherical balls 12 is preferably 140 mm with the concentrators or paraboloid mirrors 11 having a diameter of 4 m. Of course, in addition to the materials mentioned, balls of other suitable materials and dimensions may be utilized with the system of the invention.

As previously indicated, the holding devices 13a, 13b, 13n will hold the balls at the focal points of the mirrors 11 for a given period to enable adequate heating thereof. Subsequently, the balls are released from the irradiation position and it will be understood that the holding devices 13 may be either electrical temperature sensors or thermomechanical devices which operate to release the balls by sensing the temperature thereof.

The switches 15 operate to maintain negligibly small the time during which the irradiation position is vacant. By maintaining a ball 12 in a waiting position 14 at the inlet of each concentrator 11, and by appropriately controlling the switches 15, a cold ball 12 may be moved to replace a heated ball 12 at the focal point of the concentrators 11 within a very short time.

It is of significant advantage if the balls 12 are transported within the system with as little energy expenditure as possible. Accordingly, utilization of gravity feed by imparting a slope to the tracks of the feed and return roller system enables more efficient operation of the system.

In one embodiment of the invention, the feed and return roller system 16 may be designed in such a way that the tracks 17 and 18 are formed of enclosed, heat-insulated piping.

Although a natural gravity slope in the feed and return system 16 may be in itself sufficient for transporting the balls within the system, where longer paths of travel may be involved and also for reasons of providing a power assist to the ball transport system, a compressed air system may be used to generate a motive force for moving the balls within the enclosed pipes of the tracks 17 and 18.

Of course, in more simple arrangements, it is possible to provide that the feed and roller system 16 is formed of tracks 17 and 18 which constitute open channels. In such a case, a chain drive mechanism may be utilized in place of the sloped configuration of the tracks 17 and 18 to transport the balls through the roller system 16.

As previously indicated, the heat accumulator 19 may be structured so that the incoming balls are conveyed to the upper side thereof with the cold balls being removed from the bottom side of the accumulator 19. The accumulator 19 may be arranged as a free-standing member on a surface. Additionally, the accumulator may be built to be sunk into a ground formation. Of course, depending upon the height of the accumulator 19 appropriate elevator means such as the elevators 20 and 21 may be provided. Of course, a continuous supply of balls to the concentrators should be provided and for this purpose the intake and discharge of balls to and from the accumulator may be appropriately organized. Furthermore, it may be provided that concentrators 11 are connected in series relative to the heat accumulator or it may also be that when several rows of concentrators must be utilized they may be connected in parallel.

Of course, it is desirable if pressure losses from the accumulator 19 are avoided as much as possible and the ball inlet and ball outlet means at the heat accumulator should be constructed with pressure locks such as the lock 22. Of course, where a number of concentrators or rows of concentrators are utilized an appropriate plurality of pressure locks such as the lock 22 may be provided.

The heat capacity of the accumulator may be varied by varying the number of balls which are arranged in the accumulator. Thus, it will be apparent that the heat accumulator 19 may be filled with a different quantity of balls depending upon the required capacity of the system.

Removal of heat from the accumulator 19 is preferably effected as previously described by means of a gaseous medium such as air and in order to boost the efficiency of the system the blower 27 and the motor 28 may be provided. A further energy efficient characteristic involves arrangement of the heat exchanger 26 within the interior of the accumulator housing 23.

The solar farm in accordance with the present invention involves significant advantages. For example, among others, it should be noted that the ball tracks operate without thermal load and are utilized instead of temperature-resistant, insulated heat-transporting pipes. Times for preheating are reduced to a minimum and heat losses during transport of the balls may become negligible. Temperatures can be easily controlled and the control may be carried out for each concentrator without influencing an adjacent concentrator. The volume of the accumulator 19 may be kept small thereby resuting in insignificant thermal losses and the entire plant will be generally easy and simple to maintain. Indeed, requirements for auxiliary energy may be kept at a minimum.

While specific embodiments of the invention have been shown and described in detail to illustrate the application of the inventive principles, it will be understood that the invention may be embodied otherwise without departing from such principles.

What is claimed is:

1. A solar energy system comprising: solar radiation focalization means; a plurality of solid solar radiation absorption bodies interacting with said focalization means to effect heating of said absorption bodies by solar radiation through operation of said focalization means; said focalization means comprising a plurality of solar radiation concentrators defining focal points which constitute irradiation positions at which said absorption bodies may be located to absorb solar radiation; heat accumulator means receiving heated absorption bodies from said focalization means and withdrawing heat from said absorption bodies thus received; feed and return means for transporting said absorption bodies between said accumulator means and said focalization means; and means for delivering said absorption bodies individually to said irradiation positions at said radiation concentrators and for maintaining said bodies in position to receive concentrated solar energy from said concentrators until said bodies have reached a desired temperature.

2. A system according to claim 1 wherein said radiation concentrators comprise paraboloid mirrors.

3. A system according to claim 1 wherein said radiation absorption bodies comprise spherical balls.

4. A system according to claim 3 including means responsive to the temperature of said balls for releasing said balls from said irradiation position when said balls have reached said desired temperature.

5. A system according to claim 4 wherein said releasing means comprise electrical temperature sensors.

6. A system according to claim 4 wherein said releasing means comprise thermomechanical means.

7. A system according to claim 1 including means defining a waiting position for said balls for each of said radiation concentrators from which said balls may be transported to said irradiation positions, and switch means formed as part of said feed and return system adapted to sense whether said waiting positions are occupied by a ball and for effecting delivery of the balls to unoccupied waiting positions.

8. A system according to claim 7 further comprising means for releasing a ball located at said waiting positions and for delivering said releasing ball to said irradiation positions.

9. A system according to claim 1 wherein said feed and return means are formed with a sloping configuration in order to effect transport of said absorption bodies through said system by gravity forces.

10. A system according to claim 1 wherein said feed and return means comprise enclosed heat insulated piping.

11. A system according to claim 1 wherein said feed and return means comprise compressed air means for transporting said absorption bodies through said system between said accumulator means and said focalization means.

12. A system according to claim 9 wherein said feed and return means comprise open channels sloped to effect movement therein of said absorption bodies between said accumulator means and said focalization means.

13. A system according to claim 12 wherein said feed and return means further comprise chain drive means for assisting in the transportation of said absorption bodies of said system.

14. A system according to claim 1 wherein said heat accumulator means comprises a generally upstanding configuration having an upper end and a lower end and wherein said feed and return means comprise means for supplying heated balls from said focalization means to said upper end of said accumulator means and means for removing balls for return to said focalization means from said bottom end of said accumulator means.

15. A system according to claim 14 wherein said feed and return means include return track means interposed as part of said system returning absorption bodies from said accumulator means to said focalization means and discharge elevator means in operative relationship with said accumulator means for feeding said absorption bodies leaving said accumulator means to said return track means.

16. A system according to claim 14 wherein said feed and return means comprise delivery elevator means provided in operative relationship with said heat accumulator means forming part of said system delivering said absorption bodies into said heat accumulator means.

17. A system according to claim 1 wherein for each absorption body removed from said heat accumulator means another absorption body is delivered thereinto.

18. A system according to claim 1 wherein said plurality of radiation concentrators are arranged to form at least one row extending in series relationship with said heat accumulator means with regard to transportation of said absorption bodies within said system.

19. A system according to claim 18 wherein said radiation concentrators comprise a plurality of said series-arranged rows, each of said rows arranged in parallel with each other relative to said heat accumulator means.

20. A system according to claim 1 wherein said heat accumulator means comprise pressure lock means for enabling said absorption bodies to be introduced into and removing from said heat accumulator means without pressure loss.

21. A system according to claim 1 wherein said heat accumulator means comprise a gaseous medium for removing heat from absorption bodies within said heat accumulator means.

22. A system according to claim 21 wherein said absorption bodies are arranged within said heat accumulator means in a generally vertical stack and wherein said heat accumulator means further comprise blower means and heat exchanger means, said blower means operating to convey said gaseous medium through said stack toward said heat exchanger means.

23. A system according to claim 22 wherein said heat exchanger means is arranged within the interior of said heat accumulator means.

24. A system according to claim 23 wherein said heat accumulator means include means defining an interior space therein for receiving said absorption bodies and means defining an intermediate space for allowing passage of said gaseous medium through said heat accumulator means.

25. A system according to claim 1 wherein said absorption bodies comprise generally spherical balls being formed as hermetically sealed jackets which are filled with latent storage material.

26. A system according to claim 25 wherein said spherical jackets consist of welded steel and wherein said filling material is LiF/LiCl.

* * * * *